(12) United States Patent
Lainema et al.

(10) Patent No.: US 12,395,648 B2
(45) Date of Patent: *Aug. 19, 2025

(54) APPARATUS, A METHOD AND A COMPUTER PROGRAM FOR VIDEO CODING

(71) Applicant: NOKIA TECHNOLOGIES OY, Espoo (FI)

(72) Inventors: Jani Lainema, Tampere (FI); Kemal Ugur, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 135 days.

This patent is subject to a terminal disclaimer.

(21) Appl. No.: 17/836,309

(22) Filed: Jun. 9, 2022

(65) Prior Publication Data

US 2022/0303556 A1 Sep. 22, 2022

Related U.S. Application Data

(63) Continuation of application No. 16/882,199, filed on May 22, 2020, now Pat. No. 11,368,700, which is a
(Continued)

(51) Int. Cl.
*H04N 19/182* (2014.01)
*H04N 19/105* (2014.01)
(Continued)

(52) U.S. Cl.
CPC ......... *H04N 19/182* (2014.11); *H04N 19/105* (2014.11); *H04N 19/107* (2014.11);
(Continued)

(58) Field of Classification Search
CPC ......... H04N 19/00024; H04N 19/0003; H04N 19/00042; H04N 19/00303;
(Continued)

(56) References Cited

U.S. PATENT DOCUMENTS 6,510,178 B1 1/2003 Fimoff et al.
7,466,774 B2 12/2008 Boyce
(Continued)

FOREIGN PATENT DOCUMENTS

CN 101222644 A 7/2008
CN 101502124 A 8/2009
(Continued)

OTHER PUBLICATIONS

"Advanced Video Coding for Generic Audiovisual Services", Series H: Audiovisual and Multimedia Systems, Infrastructure of audiovisual services—Coding of moving video, ITU-T Recommendation H.264, Mar. 2009, 670 pages.
(Continued)

*Primary Examiner* — James M Pontius
(74) *Attorney, Agent, or Firm* — ALSTON & BIRD LLP

(57) ABSTRACT

There is disclosed an apparatus, a method and a computer program for video coding. The apparatus comprises a selector configured for selecting a pixel for prediction; a projection definer configured for determining a projection of said pixel to a set of reference pixels; and a prediction definer configured for selecting one or more reference pixels from said set of reference pixels on the basis of said projection, and using said selected one or more reference pixels to obtain a prediction value for said pixel to be predicted.

48 Claims, 9 Drawing Sheets

Related U.S. Application Data continuation of application No. 16/278,596, filed on Feb. 18, 2019, now Pat. No. 10,666,956, which is a continuation of application No. 15/951,516, filed on Apr. 12, 2018, now Pat. No. 10,212,433, which is a continuation of application No. 15/676,665, filed on Aug. 14, 2017, now Pat. No. 9,948,937, which is a continuation of application No. 13/023,328, filed on Feb. 8, 2011, now Pat. No. 9,736,486.

(60) Provisional application No. 61/302,303, filed on Feb. 8, 2010.

(51) Int. Cl.
  *H04N 19/107* (2014.01)
  *H04N 19/11* (2014.01)
  *H04N 19/196* (2014.01)

(52) U.S. Cl.
  CPC ........... *H04N 19/11* (2014.11); *H04N 19/196* (2014.11); *H04N 19/197* (2014.11)

(58) Field of Classification Search
  CPC ....... H04N 19/00369; H04N 19/00375; H04N 19/182; H04N 19/197; H04N 19/105; H04N 19/196; H04N 19/11; H04N 19/107
  USPC .................................................. 375/240.12
  See application file for complete search history.

(56) References Cited

U.S. PATENT DOCUMENTS

| | | | | |
|---|---|---|---|---|
| 8,000,390 | B2 | 8/2011 | Zhao et al. | |
| 8,311,110 | B2 | 11/2012 | Alshina et al. | |
| 9,736,486 | B2 * | 8/2017 | Lainema | H04N 19/105 |
| 9,948,937 | B2 * | 4/2018 | Lainema | H04N 19/182 |
| 10,212,433 | B2 * | 2/2019 | Lainema | H04N 19/105 |
| 10,666,956 | B2 * | 5/2020 | Lainema | H04N 19/196 |
| 11,368,700 | B2 * | 6/2022 | Lainema | H04N 19/105 |
| 2003/0138150 | A1 | 7/2003 | Srinivasan | |
| 2005/0123051 | A1 | 6/2005 | Wang et al. | |
| 2005/0254717 | A1 * | 11/2005 | Kalevo | H04N 19/593 |
| | | | | 375/E7.266 |
| 2006/0067403 | A1 | 3/2006 | Sakal et al. | |
| 2006/0120456 | A1 | 6/2006 | Tasaka et al. | |
| 2006/0153292 | A1 | 7/2006 | Liang et al. | |
| 2006/0233251 | A1 | 10/2006 | Kim et al. | |
| 2007/0053433 | A1 | 3/2007 | Song | |
| 2007/0110153 | A1 | 5/2007 | Cho et al. | |
| 2007/0133891 | A1 * | 6/2007 | Jeong | H04N 19/593 |
| | | | | 375/E7.176 |
| 2007/0206872 | A1 | 9/2007 | Song | |
| 2008/0170615 | A1 | 7/2008 | Sekiguchi et al. | |
| 2008/0175319 | A1 | 7/2008 | Sun et al. | |
| 2009/0097557 | A1 | 4/2009 | Takahashi et al. | |
| 2009/0225834 | A1 | 9/2009 | Song et al. | |
| 2009/0238276 | A1 | 9/2009 | Har-Noy et al. | |
| 2009/0304084 | A1 | 12/2009 | Hallapuro et al. | |
| 2010/0027655 | A1 | 2/2010 | Matsuo et al. | |
| 2010/0098345 | A1 * | 4/2010 | Andersson | H04N 19/194 |
| | | | | 382/238 |
| 2010/0128995 | A1 | 5/2010 | Drugeon et al. | |
| 2010/0166327 | A1 | 7/2010 | Goel | |
| 2010/0208802 | A1 | 8/2010 | Tsukuba et al. | |
| 2010/0232505 | A1 | 9/2010 | Thoreau et al. | |
| 2010/0239002 | A1 | 9/2010 | Park et al. | |
| 2011/0038414 | A1 | 2/2011 | Song et al. | |
| 2011/0110425 | A1 * | 5/2011 | Zhang | H04N 19/182 |
| | | | | 375/E7.243 |
| 2011/0182357 | A1 | 7/2011 | Kim et al. | |
| 2011/0194784 | A1 | 8/2011 | Laroche et al. | |
| 2011/0243229 | A1 | 10/2011 | Kim et al. | |
| 2012/0033736 | A1 | 2/2012 | Sato | |

FOREIGN PATENT DOCUMENTS

| | | |
|---|---|---|
| CN | 100568976 C | 12/2009 |
| EP | 1696676 A2 | 8/2006 |
| EP | 2 056 606 A1 | 5/2009 |
| EP | 2 081 386 A1 | 7/2009 |
| EP | 2086239 A2 | 8/2009 |
| EP | 2242275 A1 | 10/2010 |
| KR | 100739130 B1 | 7/2007 |
| KR | 10-2007-0104595 A | 10/2007 |
| KR | 10-2009-0079894 A | 7/2009 |
| WO | WO 01/54416 A1 | 7/2001 |
| WO | WO 2008/085109 A1 | 7/2008 |
| WO | WO 2008/102805 A1 | 8/2008 |
| WO | WO 2009/090884 A1 | 7/2009 |

OTHER PUBLICATIONS

"Video Coding for Low Bit Rate Communication", Series H: Audiovisual and Multimedia Systems, Infrastructure of Audiovisual Services—Coding of moving video, ITU-T Recommendation H.263, Jan. 2005, 226 pages.

Brief Communication regarding the Oral Proceedings for European Application No. 11739487.4 dated Nov. 25, 2020, 8 pages.

Decision to Refuse for European Application No. 11739487.4 dated Jan. 13, 2021, 26 pages.

Extended European Search Report from corresponding European Patent Application No. 11739487.4 dated Dec. 21, 2016.

International Search Report and Written Opinion, received in corresponding Patent Cooperation Treaty Application No. PCT/IB2011/050535, Dated Jun. 21, 2011, 13 pages.

Korean Office Action for Application No. 2012/7023340, dated Sep. 30, 2013.

Minutes of the Oral Proceedings for European Application No. 11739487.4 dated Dec. 23, 2020, 6 pages.

Notice of Allowance for Chinese Application No. 201180017741.5 dated Feb. 3, 2016, 3 pages.

Notice of Allowance for Korean Application No. 10-2012-7023340 dated Aug. 18, 2014, 3 pages.

Notice of Allowance for Taiwanese Application No. 100104118 dated Jul. 22, 2016, 3 pages.

Notice of Allowance for U.S. Appl. No. 16/882,199 dated Feb. 22, 2022.

Notice of Allowance for U.S. Appl. No. 16/882,199 dated Nov. 18, 2021.

Notice of Allowance for U.S. Appl. No. 13/023,328 dated Apr. 12, 2017.

Notice of Allowance for U.S. Appl. No. 15/676,665 dated Dec. 7, 2017.

Notice of Allowance for U.S. Appl. No. 15/951,516 dated Oct. 5, 2018.

Notice of Allowance for U.S. Appl. No. 16/278,596 dated Jan. 15, 2020.

Office Action for Chinese Application No. 201180017741.5 dated Aug. 18, 2015.

Office Action for European Application No. 11 739 487.4 dated Feb. 3, 2020, 6 pages.

Office Action for India Application No. 7350/CHENP/2012 dated Dec. 7, 2018, 6 pages.

Office Action for Taiwanese Application No. 100104118 dated Sep. 30, 2015, 11 pages.

Office Action for Thailand Application No. 1101000171 dated Nov. 20, 2018, 3 pages.

Office Action for U.S. Appl. No. 13/023,328 dated Apr. 25, 2013.
Office Action for U.S. Appl. No. 13/023,328 dated Dec. 4, 2013.
Office Action for U.S. Appl. No. 13/023,328 dated Feb. 17, 2016.
Office Action for U.S. Appl. No. 13/023,328 dated Jul. 16, 2015.
Office Action for U.S. Appl. No. 13/023,328 dated Oct. 7, 2014.
Office Action for U.S. Appl. No. 13/023,328 dated Sep. 22, 2016.
Office Action from Chinese Patent Application No. 201180017741.5 dated Dec. 2, 2014.

(56) References Cited

OTHER PUBLICATIONS

Pan, Feng, "Fast Mode Decision Algorithm for Intraprediction in H.264/AVC Video Coding". IEEE Transactions on Circuits and Systems for Video Technology, vol. 15, No. 7. Jul. 2005. pp. 813-822.
Second Examination Report for Indian Application No. 7350/CHENP/2012 dated Oct. 21, 2020, 2 pages.
Summons to Attend Oral Proceedings for European Application No. 11739487.4 dated Aug. 14, 2020.
Wiegand, Thomas, "Overview of the H.264/AVC Video Coding Standard". IEEE Transactions on Circuits and Systems for Video Technology, vol. 13, No. 7. Jul. 2003. pp. 560-676.
Decision to Refuse for European Application No. 11739487.4 dated Jan. 13, 2021, 15 pages.
Office Action for Thailand Application No. 1101000171 dated Jul. 10, 2023, 12 pages.
Decision on Invalidation Request for Chinese Application No. 201180017741.5 dated Oct. 18, 2022, 37 pages.
Invalidation Request for Chinese Application No. 201180017741.5 dated Mar. 22, 2022, 91 pages.
JCTVC-A125, "BBC's Response to the Call for Proposals on Video Compression Technology", Joint Collaborative Team on Video Coding (JCT-VC) of ITU-T SG16 WP3 and ISO/IEC JTC1/SC29/WG11, 1st Meeting, (Apr. 15-23, 2010), 30 pages.
JCTVC-A205, "Test Model under Consideration" Joint Collaborative Team on Video Coding (JCT-VC) of ITU-T SG16 WP3 and ISO/IEC JTC1/SC29/WG11, draft002, 1st Meeting, (Apr. 15-23, 2010), 113 pages.
Park et al., "Selective Intra Prediction Mode Decision for H.264/AVC Encoders", World Academy of Science, Engineering and Technology, International Journal of Electronics and Communication Engineering, vol. 2, No. 1, (2008), 5 pages.
Zhou et al., "An Interpolation Method by Predicting the Direction of Pixel Texture Changing Trend for H.264/AVC Intra Prediction", 2008 Second International Symposium on Intelligent Information Technology Application, (Jan. 6, 2009), 5 pages.
U.S. Appl. No. 16/882,199, filed May 22, 2020, U.S. Pat. No. 11,368,700.
U.S. Appl. No. 16/278,596, filed Feb. 18, 2019, U.S. Pat. No. 10,666,956.
U.S. Appl. No. 15/951,516, filed Apr. 12, 2018, U.S. Pat. No. 10,212,433.
U.S. Appl. No. 15/676,665, filed Aug. 14, 2017, U.S. Pat. No. 9,948,937.
U.S. Appl. No. 13/023,328, filed Feb. 8, 2011, U.S. Pat. No. 9,736,486.
Communication of the Board of Appeal for European Application No. 11739487.4 dated Feb. 16, 2024, 13 pages.
Minutes of the Oral Proceedings for European Application No. 11739487.4 dated Jul. 5, 2024, 12 pages.
Extended European Search Report for European Application No. 24182174.3 dated Jan. 27, 2025, 12 pages.
Shiodera et al., "Bidirectional intra prediction", ITU—Telecommunications Standardization Sector, Study Group 16 Question 6, Video Coding Experts Group (VCEG), Document VCEG-AE14, (Jan. 15-16, 2007), 6 pages.

\* cited by examiner

APPARATUS, A METHOD AND A COMPUTER PROGRAM FOR VIDEO CODING

CROSS REFERENCE TO RELATED APPLICATIONS

This application is a continuation of U.S. application Ser. No. 16/882,199, filed May 22, 2020, which is a continuation of U.S. application Ser. No. 16/278,596, filed Feb. 18, 2019, which is a continuation of U.S. application Ser. No. 15/951, 516, filed Apr. 12, 2018, which is a continuation of U.S. application Ser. No. 15/676,665, filed Aug. 14, 2017, which is a continuation of U.S. application Ser. No. 13/023,328, filed Feb. 8, 2011, which claims priority to U.S. Provisional Application No. 61/302,303 filed Feb. 8, 2010, the entire contents of which are incorporated herein by reference.

TECHNICAL FIELD

The present invention relates to an apparatus, a method and a computer program for encoding and decoding.

BACKGROUND INFORMATION

A video codec may comprise an encoder which transforms input video into a compressed representation suitable for storage and/or transmission and a decoder that can uncompress the compressed video representation back into a viewable form, or either one of them. Typically, the encoder discards some information in the original video sequence in order to represent the video in a more compact form, for example at a lower bit rate.

Typical video codecs, operating for example according to the International Telecommunication Union's ITU-T H.263 and H.264 coding standards, encode video information in two phases. In the first phase, pixel values in a certain picture area or "block" are predicted. These pixel values can be predicted, for example, by motion compensation mechanisms, which involve finding and indicating an area in one of the previously encoded video frames (or a later coded video frame) that corresponds closely to the block being coded. Additionally, pixel values can be predicted by spatial mechanisms which involve finding and indicating a spatial region relationship.

Prediction approaches using image information from a previous (or a later) image can also be called as Inter prediction methods, and prediction approaches using image information within the same image can also be called as Intra prediction methods.

The second phase is one of coding the error between the predicted block of pixels and the original block of pixels. This is typically accomplished by transforming the difference in pixel values using a specified transform. This transform is typically a Discrete Cosine Transform (DCT) or a variant thereof. After transforming the difference, the transformed difference is quantized and entropy encoded.

By varying the fidelity of the quantization process, the encoder can control the balance between the accuracy of the pixel representation, (in other words, the quality of the picture) and the size of the resulting encoded video representation (in other words, the file size or transmission bit rate).

The decoder reconstructs the output video by applying a prediction mechanism similar to that used by the encoder in order to form a predicted representation of the pixel blocks (using the motion or spatial information created by the encoder and stored in the compressed representation of the image) and prediction error decoding (the inverse operation of the prediction error coding to recover the quantized prediction error signal in the spatial domain).

After applying pixel prediction and error decoding processes the decoder combines the prediction and the prediction error signals (the pixel values) to form the output video frame.

The decoder (and encoder) may also apply additional filtering processes in order to improve the quality of the output video before passing it for display and/or storing as a prediction reference for the forthcoming frames in the video sequence.

In typical video codecs, the motion information is indicated by motion vectors associated with each motion compensated image block. Each of these motion vectors represents the displacement of the image block in the picture to be coded (in the encoder) or decoded (at the decoder) and the prediction source block in one of the previously coded or decoded images (or pictures). In order to represent motion vectors efficiently, motion vectors are typically coded differentially with respect to block specific predicted motion vector. In a typical video codec, the predicted motion vectors are created in a predefined way, for example by calculating the median of the encoded or decoded motion vectors of the adjacent blocks.

In typical video codecs the prediction residual after motion compensation is first transformed with a transform kernel (like DCT) and then coded. The reason for this is that often there still exists some correlation among the residual and transform can in many cases help reduce this correlation and provide more efficient coding.

Typical video encoders utilize the Lagrangian cost function to find optimal coding modes, for example the desired macro block mode and associated motion vectors. This type of cost function uses a weighting factor or $\lambda$ to tie together the exact or estimated image distortion due to lossy coding methods and the exact or estimated amount of information required to represent the pixel values in an image area. This may be represented by the equation:

$$C = D + \lambda R \qquad (1)$$

where C is the Lagrangian cost to be minimised, D is the image distortion (for example, the mean-squared error between the pixel values in original image block and in coded image block) with the mode and motion vectors currently considered, $\lambda$ is a Lagrangian coefficient and R is the number of bits needed to represent the required data to reconstruct the image block in the decoder (including the amount of data to represent the candidate motion vectors).

Some hybrid video codecs, such as H.264/AVC, predict the Intra coded areas by spatial means utilizing the pixel values of the already processed areas in the picture. A typical codec has a fixed set of available prediction methods which provide predictions from the corresponding direction. If the number of available prediction directions is low, the compression performance may suffer as there may not be a method matching to all the directional structures in the picture content. If the number of available prediction directions is large the implementation complexity may become a burden. Some codecs use a small number of directional intra prediction methods, for example from 2 to 8 different directions, which may lead into suboptimal performance but may keep the implementation complexity at a moderate level.

SUMMARY

This invention provides some embodiments which may support a relatively large number of prediction directions in an Intra prediction subsystem of a video codec. According to some embodiments the prediction process is defined by a displacement measure between one line of pixels and a reference line of pixels at a given granularity, either in a horizontal or a vertical direction. When deriving predicted values for each pixel in the block the selected displacement is used to calculate a projection of each pixel to the line of reference pixels and an interpolation operation is applied to calculate final prediction values utilizing the distance of the projected pixel location from the closest reference pixels.

According to a first aspect of the invention, there is provided an apparatus comprising:
  a selector configured for selecting a pixel for prediction;
  a projection definer configured for determining a projection of said pixel to a set of reference pixels; and
  a prediction definer configured for selecting one or more reference pixels from said set of reference pixels on the basis of said projection, and using said selected one or more reference pixels to obtain a prediction value for said pixel to be predicted.

According to a second aspect of the invention there is provided a method comprising:
  selecting a pixel for prediction;
  determining a projection of said pixel to a set of reference pixels;
  selecting one or more reference pixels from said set of reference pixels on the basis of said projection; and
  obtaining a prediction value for said pixel to be predicted by using said selected one or more reference pixels.

According to a third aspect of the invention there is provided a computer readable storage medium stored with code thereon for use by an apparatus, which when executed by a processor, causes the apparatus to perform:
  select a pixel for prediction;
  determine a projection of said pixel to a set of reference pixels;
  select one or more reference pixels from said set of reference pixels on the basis of said projection; and
  obtain a prediction value for said pixel to be predicted by using said selected one or more reference pixels.

According to a fourth aspect of the invention there is provided at least one processor and at least one memory, said at least one memory stored with code thereon, which when executed by said at least one processor, causes an apparatus to perform:
  select a pixel for prediction;
  determine a projection of said pixel to a set of reference pixels;
  select one or more reference pixels from said set of reference pixels on the basis of said projection; and
  obtain a prediction value for said pixel to be predicted by using said selected one or more reference pixels.

According to a fifth aspect of the invention there is provided an apparatus which comprises:
  an analyser configured for examining an indication of a directionality regarding a block of pixels of an image to be decoded; and
  a reconstructor configured for:
  determining a projection of a pixel of said block of pixels to be decoded on a set of reference pixels; and
  selecting one or more reference pixels from said set of reference pixels on the basis of said projection, and using said selected one or more reference pixels to obtain a prediction value for said pixel to be predicted.

According to a sixth aspect of the invention there is provided a method comprising:
  examining an indication of directionality regarding a block of pixels of an image to be decoded;
  determining a projection of a pixel of said block of pixels to be decoded on a set of reference pixels; and
  selecting one or more reference pixels from said set of reference pixels on the basis of said projection, and using said selected one or more reference pixels to obtain a prediction value for said pixel to be predicted.

According to a seventh aspect of the invention there is provided a computer readable storage medium stored with code thereon for use by an apparatus, which when executed by a processor, causes the apparatus to perform:
  examine an indication of a directionality regarding a block of pixels of an image to be decoded;
  determine a projection of a pixel of said block of pixels to be decoded on a set of reference pixels;
  select one or more reference pixels from said set of reference pixels on the basis of said projection, and
  use said selected one or more reference pixels to obtain a prediction value for said pixel to be predicted.

According to an eighth aspect of the invention there is provided at least one processor and at least one memory, said at least one memory stored with code thereon, which when executed by said at least one processor, causes an apparatus to perform:
  examine an indication of directionality regarding a block of pixels of an image to be decoded;
  determine a projection of a pixel of said block of pixels to be decoded on a set of reference pixels; and
  select one or more reference pixels from said set of reference pixels on the basis of said projection, and
  use said selected one or more reference pixels to obtain a prediction value for said pixel to be predicted.

According to a ninth aspect of the invention there is provided an encoder comprising:
  a selector configured for selecting an encoding method from a set of intra prediction modes for encoding a block of pixels of an image; and
  a selector configured for selecting a pixel for prediction;
  wherein said intra prediction mode comprises:
  a projection definer configured for determining a projection of said pixel to a set of reference pixels; and
  a prediction definer configured for selecting one or more reference pixels from said set of reference pixels on the basis of said projection, and using said selected one or more reference pixels to obtain a prediction value for said pixel to be predicted.

According to a tenth aspect of the invention there is provided a decoder which comprises:
  an analyser configured for examining an indication of a directionality regarding a block of pixels of an image to be decoded; and
  a reconstructor configured for:
  determining a projection of a pixel of said block of pixels to be decoded on a set of reference pixels; and
  selecting one or more reference pixels from said set of reference pixels on the basis of said projection, and using said selected one or more reference pixels to obtain a prediction value for said pixel to be predicted.

According to an eleventh aspect of the invention there is provided an apparatus which comprises:
  means for selecting an encoding method from a set of intra prediction modes for encoding a block of pixels of an image;
  means for selecting a pixel for prediction;
  wherein said intra prediction mode comprises:

means for determining a projection of said pixel to a set of reference pixels;

means for selecting one or more reference pixels from said set of reference pixels on the basis of said projection; and means for obtaining a prediction value for said pixel to be predicted by using said selected one or more reference pixels.

According to a twelfth aspect of the invention there is provided an apparatus which comprises:

means for examining an indication of a directionality regarding a block of pixels of an image to be decoded; and means determining a projection of a pixel of said block of pixels to be decoded on a set of reference pixels; and means for selecting one or more reference pixels from said set of reference pixels on the basis of said projection; and means for using said selected one or more reference pixels to obtain a prediction value for said pixel to be predicted.

DESCRIPTION OF THE DRAWINGS

For better understanding of the present invention, reference will now be made by way of example to the accompanying drawings in which.

DETAILED DESCRIPTION OF SOME EXAMPLE EMBODIMENTS

Figure 1:
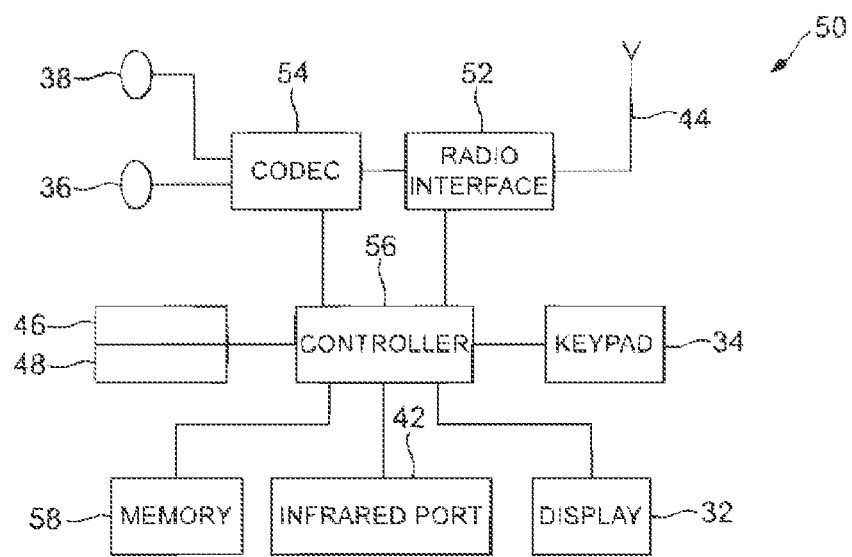
FIG. 1 shows schematically an electronic device employing some embodiments of the invention.
Figure 2:
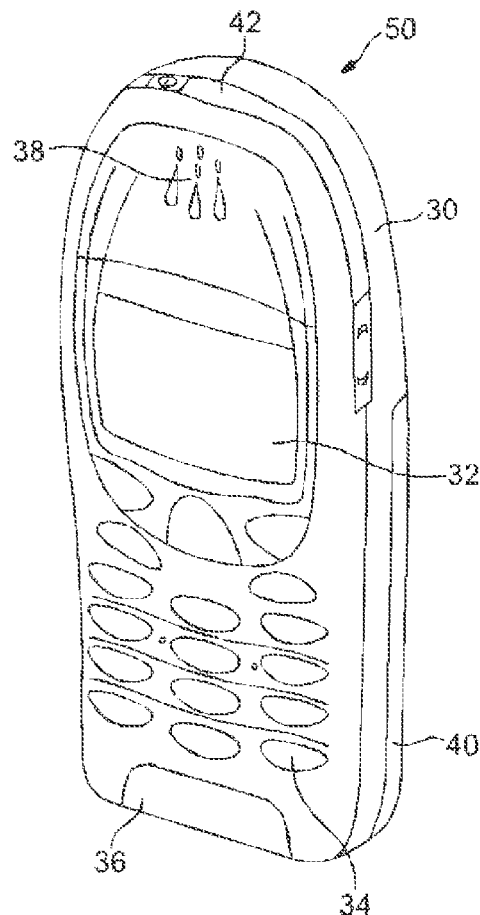
FIG. 2 shows schematically a user equipment suitable for employing some embodiments of the invention.

The following describes in further detail suitable apparatus and possible mechanisms for the provision of enhancing encoding efficiency and signal fidelity for a video codec. In this regard reference is first made to FIG. 1 which shows a schematic block diagram of an exemplary apparatus or electronic device 50, which may incorporate a codec according to an embodiment of the invention.

The electronic device 50 may for example be a mobile terminal or user equipment of a wireless communication system. However, it would be appreciated that embodiments of the invention may be implemented within any electronic device or apparatus which may require encoding and decoding or encoding or decoding video images.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The apparatus may further comprise an infrared port 42 for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56 or processor for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and decoding of audio and/or video data or assisting in coding and decoding carried out by the controller 56.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

In some embodiments of the invention, the apparatus 50 comprises a camera capable of recording or detecting individual frames which are then passed to the codec 54 or controller for processing. In some embodiments of the invention, the apparatus may receive the video image data for processing from another device prior to transmission and/or storage. In some embodiments of the invention, the apparatus 50 may receive either wirelessly or by a wired connection the image for coding/decoding.

Figure 3:
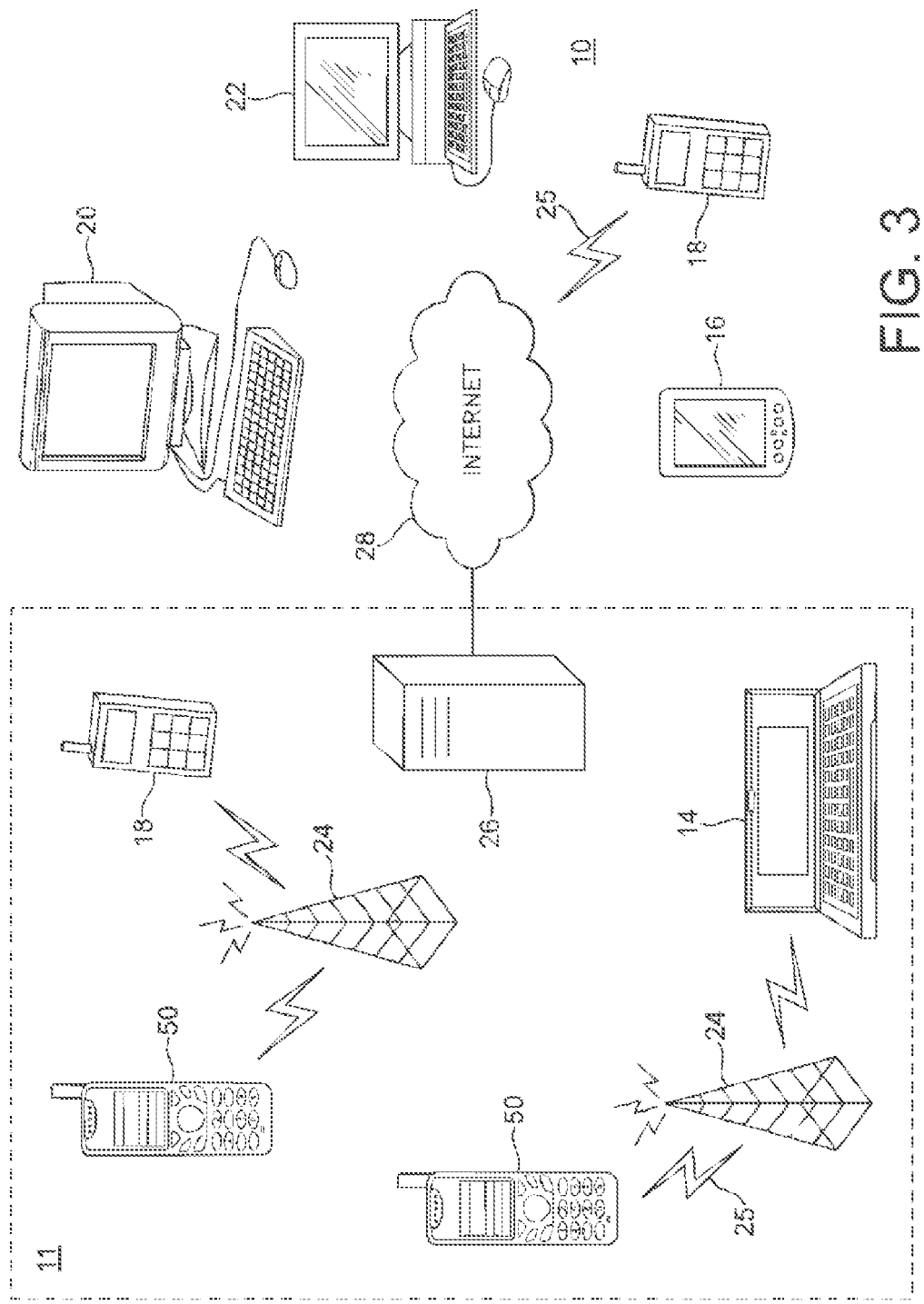
FIG. 3 further shows schematically electronic devices employing embodiments of the invention connected using wireless and wired network connections.

With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA network etc), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices or apparatus 50 suitable for implementing embodiments of the invention.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

Figure 4A:
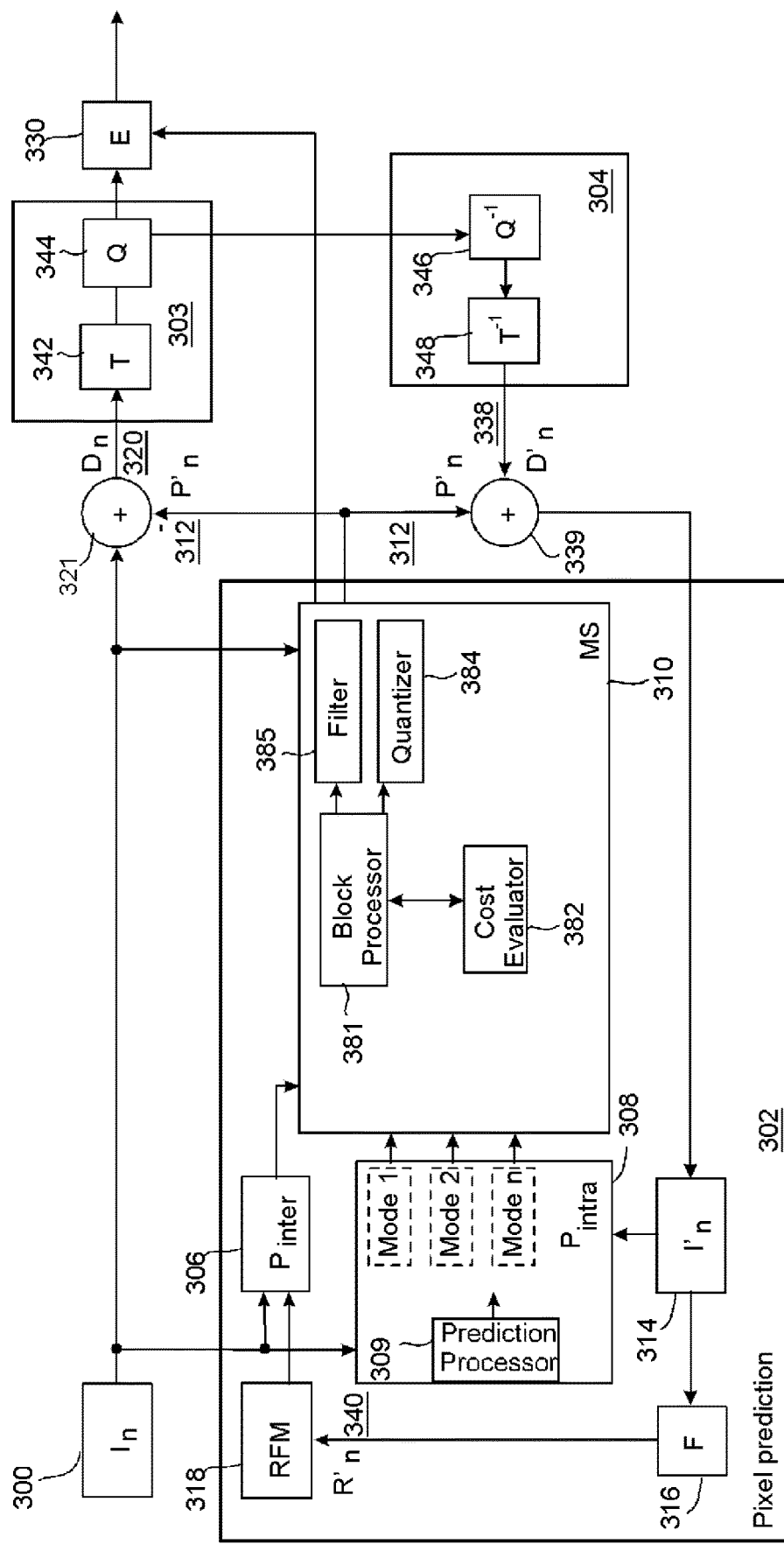
FIG. 4a shows schematically an embodiment of the invention as incorporated within an encoder.

With respect to FIG. 4a, a block diagram of a video encoder suitable for carrying out embodiments of the invention is shown. Furthermore, with respect to FIG. 5, the operation of the encoder exemplifying embodiments of the invention specifically with respect to the interpolation of the selected surface area is shown in detail.

Figure 4B:
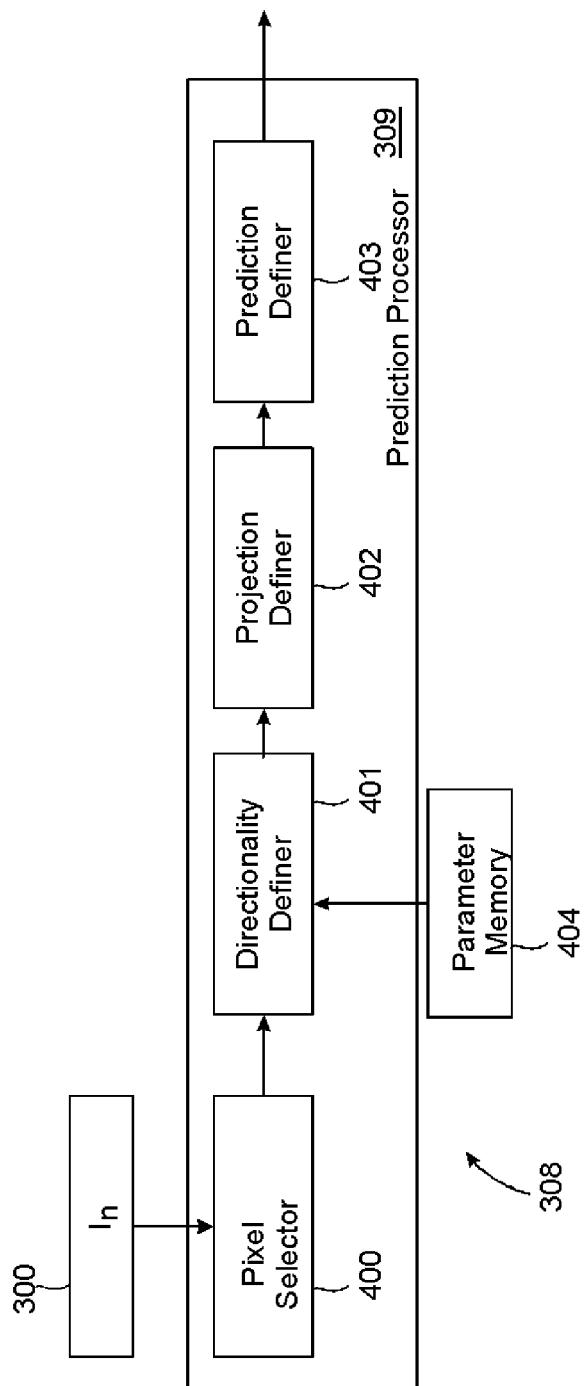
FIG. 4b shows schematically an embodiment of an intra predictor according to some embodiments of the invention.

FIG. 4a shows the encoder as comprising a pixel predictor 302, prediction error encoder 303 and prediction error decoder 304. FIG. 4a also shows an embodiment of the pixel predictor 302 as comprising an inter-predictor 306, an intra-predictor 308, a mode selector 310, a filter 316, and a reference frame memory 318. The mode selector 310 comprises a block processor 381 and a cost evaluator 382. FIG. 4b also depicts an embodiment of the intra-predictor 308 which comprises a plurality of different intra-prediction modes: Mode 1, Mode 2, . . . , Mode n and may also comprise a prediction processor 309. The mode selector 310 may also comprise a quantizer 384.

The pixel predictor 302 receives the image 300 to be encoded at both the inter-predictor 306 (which determines the difference between the image and a motion compensated reference frame 318) and the intra-predictor 308 (which determines a prediction for an image block based only on the already processed parts of current frame or picture). The output of both the inter-predictor and the intra-predictor are passed to the mode selector 310. The intra-predictor 308 may have more than one intra-prediction modes. Hence, each mode may perform the intra-prediction and provide the predicted signal to the mode selector 310. The mode selector 310 also receives a copy of the image 300.

The block processor 381 determines which encoding mode to use to encode the current block. If the block processor 381 decides to use an inter-prediction mode it will pass the output of the inter-predictor 306 to the output of the mode selector 310. If the block processor 381 decides to use an intra-prediction mode it will pass the output of one of the intra-predictor modes to the output of the mode selector 310.

According to some example embodiments the pixel predictor 302 operates as follows. The inter predictor 306 and the intra prediction modes 308 perform the prediction of the current block to obtain predicted pixel values of the current block. The intra predictor 306 and the intra prediction modes 308 provide the predicted pixel values of the current block to the block processor 381 for analyzing which prediction to select. In addition to the predicted values of the current block, the block processor 381 may, in some embodiments, receive an indication of a directional intra prediction mode from the intra prediction modes.

The block processor 381 examines whether to select the inter prediction mode or the intra prediction mode. The block processor 381 may use cost functions such as the equation (1) or some other methods to analyze which encoding method gives the most efficient result with respect to a certain criterion or criteria. The selected criteria may include coding efficiency, processing costs and/or some other criteria. The block processor 381 may examine the prediction for each directionality i.e. for each intra prediction mode and inter prediction mode and calculate the cost value for each intra prediction mode and inter prediction mode, or the block processor 381 may examine only a subset of all available prediction modes in the selection of the prediction mode.

When the cost has been calculated with respect to each or to a selected set of intra prediction modes and possibly with respect to the inter prediction mode, the block processor 381 selects one intra prediction mode or the inter prediction mode for encoding the current block. If an intra prediction mode was selected, the selected intra prediction mode includes the directionality indication which shall also be indicated to a decoder.

The indication of a directional intra prediction mode may comprise an angle indicated, for example, as a displacement of one row of the current block with respect to a reference row of pixels of a neighboring block in case of vertical prediction or as a displacement of one column of the current block with respect to a reference column of pixels of a neighboring block in case of horizontal prediction. In some embodiments the allowed displacements in the horizontal and vertical direction may depend on the size of the block to be encoded. Some example ranges are from −N to +N pixels for a block size of N×N pixels for both horizontal and vertical prediction. Other example ranges are −2N×+2N pixels, −3N×+3N pixels, −2N×+4N pixels, —4N×+2N pixels, etc. The angle may also be indicated by using other means, for example as an integer value, a floating point number, etc.

The same or different intra prediction direction can be applied for different components of the picture block (such as luminance, chrominance or depth component), or the indication of the intra prediction direction for one or more components can be used to limit the allowed set of intra prediction directions of one or more other components.

The intra prediction direction could be predicted from the neighboring macroblocks. This prediction could be done based on reconstruction values of neighboring macroblocks, intra prediction directions of neighboring macroblocks or mode of neighboring macroblocks.

Figure 8A:
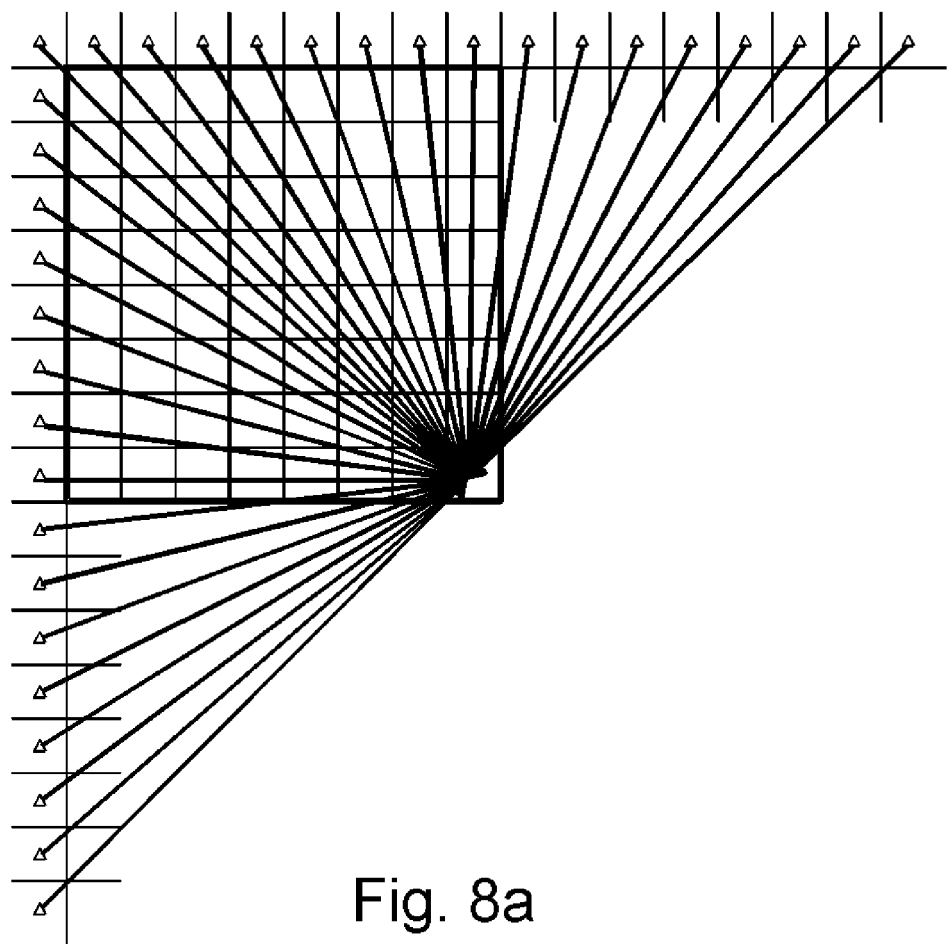
FIG. 8a depicts an example of available prediction directions for one mode of implementation.

An example of allowed displacements is illustrated in FIG. 8a in which the directionality is analyzed with respect to the current block. The displacement is expressed with reference to the last pixel at the last row of the block but it can also be expressed with reference to another pixel of the same block. The lines from the last pixel of the last row to different pixels of the neighboring blocks illustrate the allowed directions (displacements) in this example embodiment. These pixels of the neighboring blocks can be used as reference pixels for prediction of pixels of the current block. The reference pixels are indicated as triangles in FIG. 8a. In this example the block size is 8×8 and the range is from −N to +N, wherein the displacement can be from −8 to +8 pixels with one pixel resolution. In some other embodiments the difference between two consecutive, allowed displacements can be a fraction of one pixel, for example ½ pixels wherein there are more directions to select from.

Figure 8B:
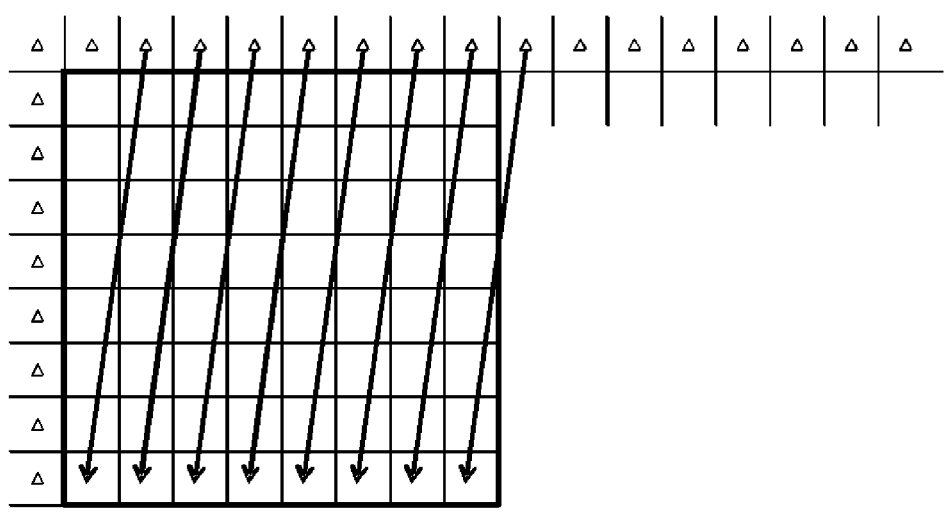
FIG. 8b depicts an example of predicting the lowest row of pixels in a block from reference pixels, when the displacement between the lowest row of the block and the reference row is one pixel to the left.
Figure 8C:
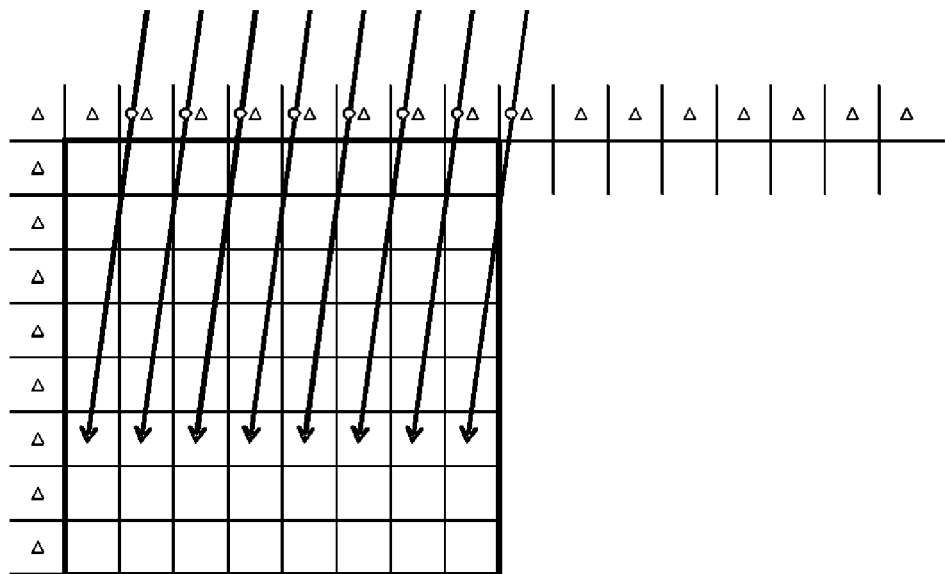
FIG. 8c depicts an example of predicting another row of pixels in a block from reference pixels, when the displacement between the lowest row of the block and the reference row is one pixel to the left.

Now, an example of an intra prediction mode will be described in more detail with reference to FIGS. 8b-8c. In the example of FIGS. 8b and 8c the intra prediction mode with the displacement of +1 pixel in horizontal direction is illustrated. As can be seen from FIG. 8b the pixels of the current block will be predicted from pixels above the current block. This can also be called as a vertical prediction. In order to obtain the predicted pixel values, a projection of each of the pixels to the reference row and column is calculated (FIG. 8b). If the projection falls in between two reference pixels (as can be seen in FIG. 8c), the prediction value is, for example, linearly interpolated from those two reference pixels, otherwise the corresponding reference pixel can used. In the example of FIG. 8b the prediction value of the last pixel on the last row of the current block is obtained from the reference row of pixels by using the pixel which is located in the next column on the reference row with reference to the pixel to be predicted i.e. the displacement is +1. Correspondingly, the prediction value of the second last pixel on the last row of the current block is obtained from the reference row of pixels by using the pixel which is located in the next column on the reference row with reference to the pixel to be predicted. In other words, the reference pixel is in the same column than the last pixel of the current block. Prediction values for the other pixels on the last row can be obtained respectively as is indicated by the arrows in FIG. 8b.

When the pixel values of the other rows of the current block are predicted the same direction value is used and also the same reference row/column. FIG. 8c illustrates the prediction of the sixth row of the current block. The angular coefficient of the projection is the same than in the situation of FIG. 8b. In this example situation, when the pixels of the sixth row are predicted, the reference values to be used are not exactly the actual reference values of the reference row but they can be obtained by using two adjacent reference pixels. This can be seen from FIG. 8c in which the arrows (directionality vectors or projections) are not going via the reference pixels of the reference row but between two adjacent reference pixels. In an example embodiment the reference values are obtained by interpolating two adjacent pixel values. The interpolation may be linear interpolation, logarithmic interpolation or some other interpolation. For example, the prediction value for the first pixel on the sixth row of the current block can be obtained by interpolating the reference pixel value on the same row than the first pixel and the reference pixel value on the next row to the left from the first pixel. The prediction values of the other pixels of the sixth row can be obtained correspondingly.

The same principles can be used when predicting the pixel values of the other rows of the current block. If the directionality vector (which can also be called a projection) is not directed exactly to the reference pixel value, the pixel values between which the directionality vector traverses are interpolated to obtain a prediction value of a pixel.

It should be noted here that the expressions "directed to a pixel" and "traversing" are only illustrative expressions to clarify the invention. In practical implementations there need not be any vectors or arrows which are directed to pixels but the block processor 381 may use some calculation algorithms to determine whether a reference pixel value or an interpolation using two adjacent pixel values shall be used to obtain a prediction value.

Figure 8D:
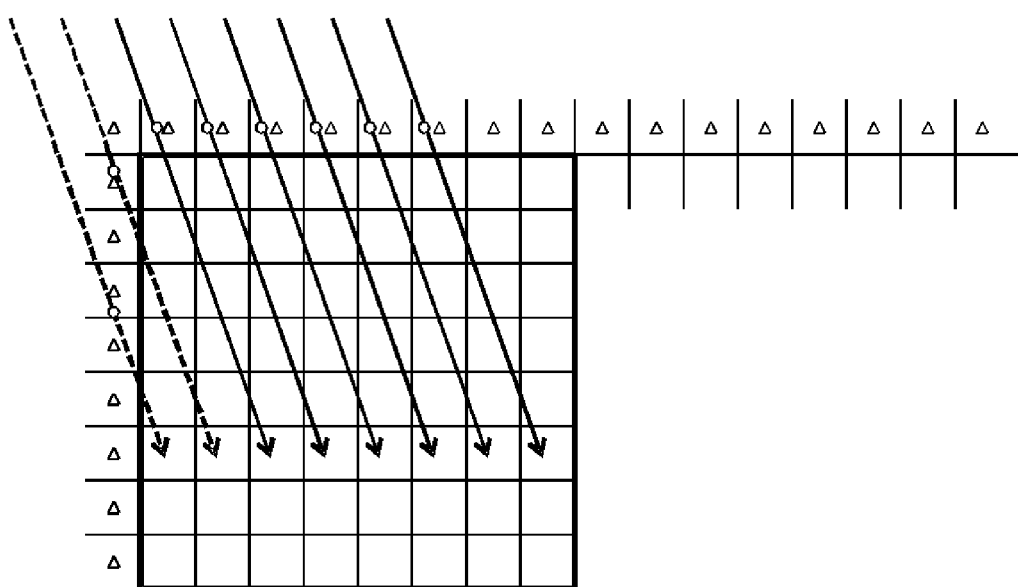
FIG. 8d depicts an example of predicting one row of pixels in a block from reference pixels, when the displacement between the lowest row of the block and the reference row is negative.

In some situations the reference value for a pixel to be predicted may not be above the current block but it may also be beside the current block. An example of such situation is illustrated in FIG. 8d. In this example the displacement is −3 pixels with reference to the last pixel on the last row of the current block. FIG. 8d reveals that the directionality vectors regarding the first and second pixel of the sixth row of the current block do not traverse between two reference pixels of the reference row but they traverse on the left side of the left most pixel of the reference row. Hence, in this example embodiment the reference values are taken from the reference column i.e. by using pixels of the column which is adjacent on the current block (on the left side). If the directionality vector traverses via a reference pixel of the reference column, that pixel value can be used as a prediction value. Otherwise interpolation is used so that the adjacent reference pixel values of the reference column between which the directionality vector traverses are interpolated.

According to the above described embodiment the prediction values of the current block can be obtained by using already decoded reference pixels on the row above the current block and/or on the column left to the current block when the encoding/decoding process proceeds from left to right and from top to bottom of an image. If the encoding/decoding order is different from that the reference pixels may also be different from the above embodiment.

The reference row and column of pixels consist of pixels already decoded and are located in this example embodiment immediately above and to the left from the current block (the block under processing), as is shown in FIG. 8a. However, the reference pixels may also be other pixels than those.

The values of the reference pixels can be filtered or processed by other means before used as a reference. In some embodiments it can be signaled if the reference pixels are processed or not and what kind of processing is applied to those pixels if they are processed.

In some embodiments there are at least as many intra prediction modes as the number of allowed directionalities. Hence, each intra prediction mode may be designed to produce only one intra prediction result. In that case the information regarding the projections and which reference pixels to use in the prediction may be implemented as parameters or other means in the intra prediction mode. For example, the intra prediction mode relating to the displacement of +1 there may be a parameter which indicates that prediction values for the last row of pixels is obtained directly (e.g. by copying) from the pixels above the current block with the displacement of +1, etc. There may also be the prediction processor 309 which can be used to perform the intra predictions for each directionality and which can be aware of the parameters.

The predicted pixel values or predicted pixel values quantized by the optional quantizer 384 are provided as the output of the mode selector.

The output of the mode selector is passed to a first summing device 321. The first summing device may subtract the pixel predictor 302 output from the image 300 to produce a first prediction error signal 320 which is input to the prediction error encoder 303.

The pixel predictor 302 further receives from a preliminary reconstructor 339 the combination of the prediction representation of the image block 312 and the output 338 of the prediction error decoder 304. The preliminary reconstructed image 314 may be passed to the intra-predictor 308 and to a filter 316. The filter 316 receiving the preliminary representation may filter the preliminary representation and output a final reconstructed image 340 which may be saved in a reference frame memory 318. The reference frame memory 318 may be connected to the inter-predictor 306 to be used as the reference image against which the future image 300 is compared in inter-prediction operations.

The operation of the pixel predictor 302 may be configured to carry out any known pixel prediction algorithm known in the art.

The pixel predictor 302 may also comprise a filter 385 to filter the predicted values before outputting them from the pixel predictor 302.

Figure 8E:
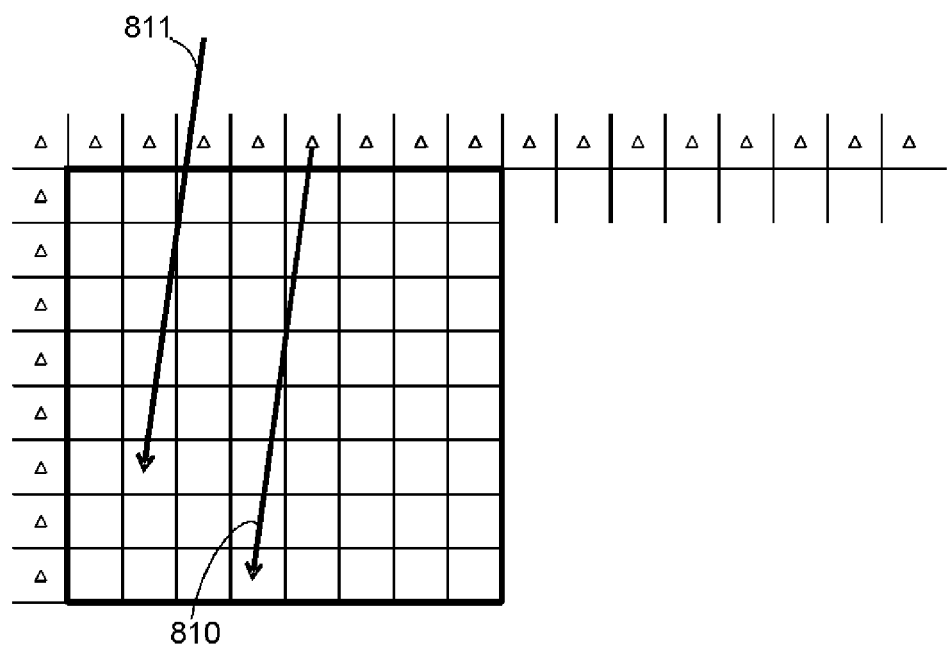
FIG. 8e depicts an example of obtaining prediction values for pixels from a block from reference pixels according to another embodiment.

In some other embodiments the prediction value may be obtained by using not the adjacent pixels but pixels farther away from each other. An example of this is illustrated in FIG. 8e. For example, if the projection of the pixel to be predicted is directed between a third reference pixel and a fourth reference pixel in the reference pixel row, as is illustrated with the arrow 810 in FIG. 8e, the prediction value may be obtained by interpolating the second and the fifth reference pixel value. Respectively, if the projection of the pixel to be predicted is directed to one reference pixel value i.e. not between two values, as is illustrated with the arrow 811 in FIG. 8e, the prediction value may be obtained by interpolating the reference pixel on the left side and the reference pixel on the right side of said one reference pixel. In the example of the arrow 811, the sixth and seventh reference values are used in the interpolation.

The operation of the prediction error encoder 302 and prediction error decoder 304 will be described hereafter in further detail. In the following examples the encoder generates images in terms of 16×16 pixel macroblocks which go to form the full image or picture. Thus, for the following examples the pixel predictor 302 outputs a series of predicted macroblocks of size 16×16 pixels and the first summing device 321 outputs a series of 16×16 pixel residual data macroblocks which may represent the difference between a first macro-block in the image 300 against a predicted macro-block (output of pixel predictor 302). It would be appreciated that other size macro blocks may be used.

The prediction error encoder 303 comprises a transform block 342 and a quantizer 344. The transform block 342 transforms the first prediction error signal 320 to a transform domain. The transform is, for example, the DCT transform. The quantizer 344 quantizes the transform domain signal, e.g. the DCT coefficients, to form quantized coefficients.

The entropy encoder 330 receives the output of the prediction error encoder and may perform a suitable entropy encoding/variable length encoding on the signal to provide error detection and correction capability. Any suitable entropy encoding algorithm may be employed.

The prediction error decoder 304 receives the output from the prediction error encoder 303 and performs the opposite processes of the prediction error encoder 303 to produce a decoded prediction error signal 338 which when combined with the prediction representation of the image block 312 at the second summing device 339 produces the preliminary reconstructed image 314. The prediction error decoder may be considered to comprise a dequantizer 346, which dequantizes the quantized coefficient values, e.g. DCT coefficients, to reconstruct the transform signal and an inverse transformation block 348, which performs the inverse transformation to the reconstructed transform signal wherein the output of the inverse transformation block 348 contains reconstructed block(s). The prediction error decoder may also comprise a macroblock filter (not shown) which may filter the reconstructed macroblock according to further decoded information and filter parameters.

Figure 5:
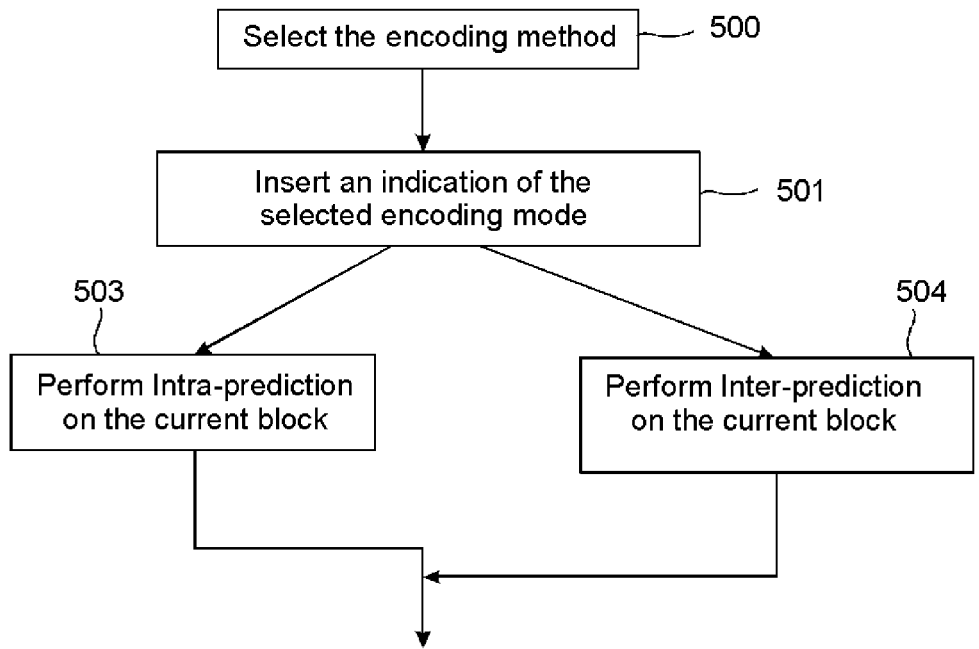
FIG. 5 shows a flow diagram showing the operation of an embodiment of the invention with respect to the encoder as shown in FIG. 4.

The operation and implementation of the mode selector 310 is shown in further detail with respect to FIG. 5. On the basis of the prediction signals from the output of the inter-predictor 306, the output of the intra-predictor 308 and/or the image signal 300 the block processor 381 determines which encoding mode to use to encode the current image block. This selection is depicted as the block 500 in FIG. 5. The block processor 381 may calculate a rate-distortion cost (RD) value or another cost value for the prediction signals which are input to the mode selector 310 and select such an encoding mode 503, 504 for which the determined cost is the smallest.

The mode selector 310 provides an indication of the encoding mode of the current block (501). The indication may be encoded and inserted to a bit stream or stored into a memory together with the image information. In connection with the intra prediction modes it may be necessary to include some indication of the selected intra prediction mode to the bit stream. For example, the indication may include information on the directionality of the intra prediction mode. In some example embodiments the information on the directionality is indicated as a displacement value. In some embodiments the displacement value indicates which reference value is used to obtain the prediction value of the last pixel of the last row of the current block. In some other embodiments the angular coefficient of the directionality is included in the bit stream. In yet another embodiments the allowed directionality values (intra prediction modes) are indexed and the index of the selected intra prediction mode is included in the bit stream.

The indication may not be included in the bit stream as such but it may also be encoded e.g. by entropy encoding. The prediction direction can also be entropy coded in a predictive manner considering used prediction directions in the image block's neighborhood, statistics of earlier prediction directions or other variables.

If the intra-prediction mode is selected, the block is predicted by an intra-prediction method (503). Respectively, if the inter-prediction mode is selected, the block is predicted by an inter-prediction method (504).

FIG. 4b depicts the intra predictor 308 of an example embodiment of the encoder in more detail. The intra predictor 308 may be implemented in a prediction processor 309 or as another circuitry. The prediction processor 309 may be a separate processor or it may be the same processor than the block processor 310. The intra predictor 308 comprises a pixel selector to select the pixel to be predicted. There is also a directionality definer 401 which determines the directionality of the prediction mode which shall be used to predict the value for the selected pixel. The directionality definer 401 may receive some parameters from the parameter memory 404. When the directionality has been determined the projection definer 402 defines the projection of the selected pixel to the set of reference pixels. The projection definer 402 may also receive some parameters from the parameter memory 404. The intra predictor 308 may further comprise a prediction definer 403 which uses the information from the projection definer and the set of reference pixels to determine the prediction value for the selected pixel. The intra predictor 308 may repeat some or all the above steps to define prediction values for all pixels of the block. The directionality need not be determined for each pixel of one block because in some embodiments the same directionality is used for each pixel of one block.

Figure 9:
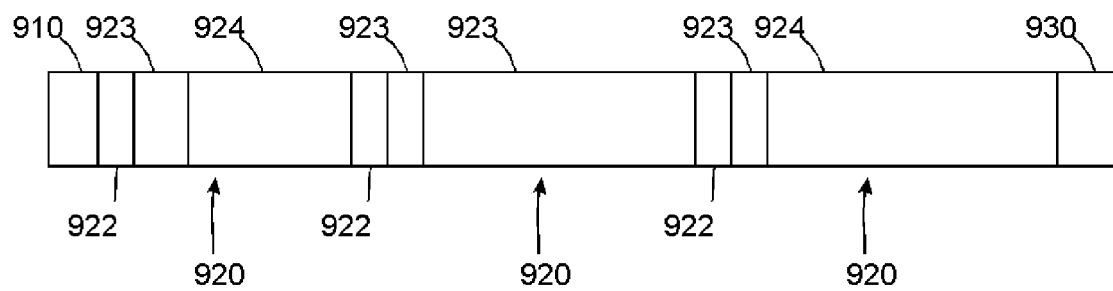
FIG. 9 depicts an example of a bit stream of an image.

In an example embodiment, as is depicted in FIG. 9, the bit stream of an image comprises an indication of the beginning of an image 910, image information of each block of the image 920, and indication of the end of the image 930. The image information of each block of the image 920 may include the indication of the prediction mode 922, indication of the directionality 923, and the indication of pixel values of the block 924 which may actually include coefficients of the residual signal when the inter- or intra-prediction has been used for the image block. It is obvious that the bit stream may also comprise other information. Further, this is only a simplified image of the bit stream and in practical implementations the contents of the bit stream may be different from what is depicted in FIG. 9.

The bit stream may further be encoded by the entropy encoder 330.

Although the embodiments above have been described with respect to the size of the macroblock being 16×16 pixels, it would be appreciated that the methods and apparatus described may be configured to handle macroblocks of different pixel sizes.

Figure 6:
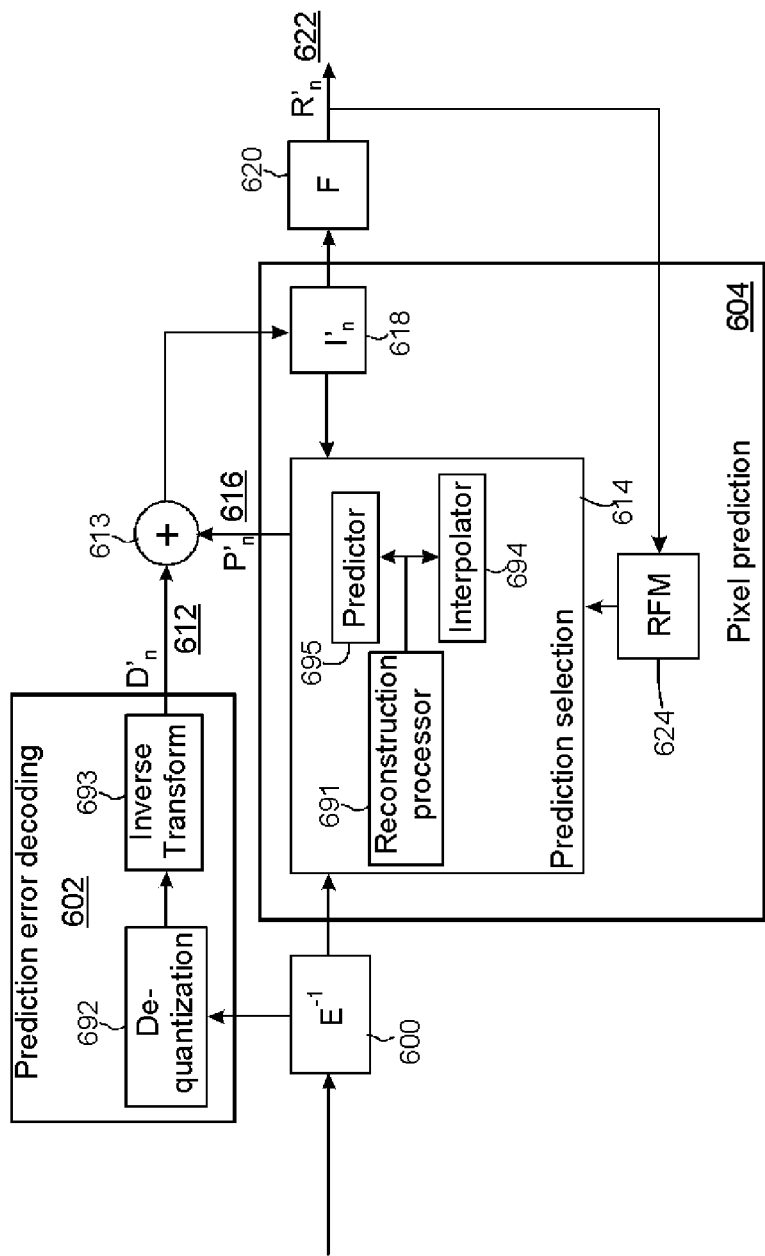
FIG. 6 shows a schematic diagram of a decoder according to some embodiments of the invention.

In the following the operation of an example embodiment of the decoder 600 is depicted in more detail with reference to FIG. 6.

For completeness a suitable decoder is hereafter described. At the decoder side similar operations are performed to reconstruct the image blocks. FIG. 6 shows a block diagram of a video decoder suitable for employing embodiments of the invention. The decoder shows an entropy decoder 600 which performs an entropy decoding on the received signal. The entropy decoder thus performs the inverse operation to the entropy encoder 330 of the encoder described above. The entropy decoder 600 outputs the results of the entropy decoding to a prediction error decoder 602 and pixel predictor 604.

The pixel predictor 604 receives the output of the entropy decoder 600. A predictor selector 614 within the pixel predictor 604 determines that an intra-prediction, an inter-prediction, or interpolation operation is to be carried out. The predictor selector may furthermore output a predicted representation of an image block 616 to a first combiner 613. The predicted representation of the image block 616 is used in conjunction with the reconstructed prediction error signal 612 to generate a preliminary reconstructed image 618. The preliminary reconstructed image 618 may be used in the predictor 614 or may be passed to a filter 620. The filter 620 applies a filtering which outputs a final reconstructed signal 622. The final reconstructed signal 622 may be stored in a reference frame memory 624, the reference frame memory 624 further being connected to the predictor 614 for prediction operations.

In the case of intra-prediction the pixel predictor 604 may also receive indication on the directionality wherein the pixel predictor 604 may select corresponding intra prediction mode for the decoding.

The prediction error decoder 602 receives the output of the entropy decoder 600. A dequantizer 692 of the prediction error decoder 602 may dequantize the output of the entropy decoder 600 and the inverse transform block 693 may perform an inverse transform operation to the dequantized signal output by the dequantizer 692. The output of the entropy decoder 600 may also indicate that prediction error signal is not to be applied and in this case the prediction error decoder produces an all zero output signal. This is the case for example with the example embodiment of this invention. However some other embodiments of the invention apply prediction error decoder unit to decode a non-zero prediction error signal.

The decoder selects the 16×16 pixel residual macroblock to reconstruct. The selection of the 16×16 pixel residual macroblock to be reconstructed is shown in step 700.

Figure 7:
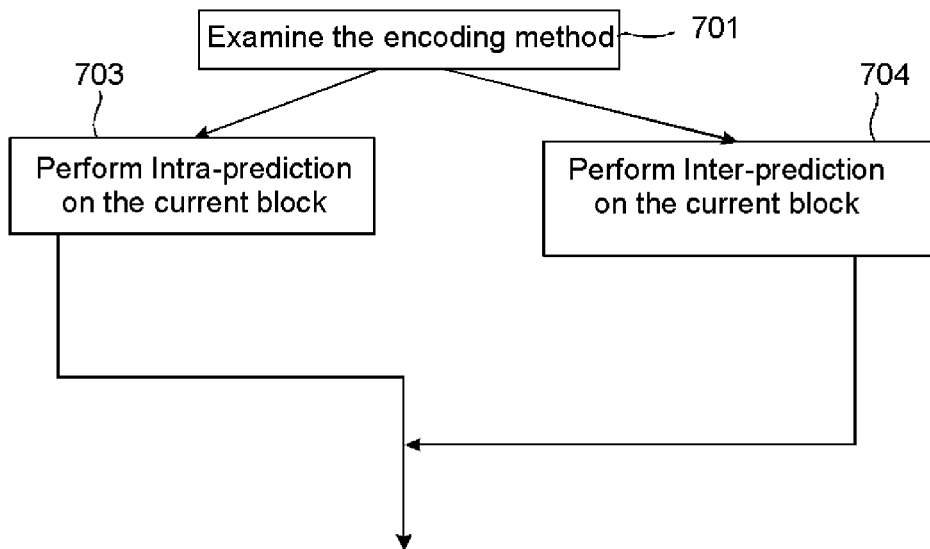
FIG. 7 shows a flow diagram of showing the operation of an embodiment of the invention with respect to the decoder shown in FIG. 6.

The decoder receives information on the encoding mode used when the current block has been encoded. The indication is decoded, when necessary, and provided to the reconstruction processor 691 of the prediction selector 614. The reconstruction processor 691 examines the indication (block 701 in FIG. 7) and selects one of the intra-prediction modes (block 703), if the indication indicates that the block has been encoded using intra-prediction, inter-prediction mode (block 704), if the indication indicates that the block has been encoded using inter-prediction. The decoder may also receive information on the directionality regarding the current block when the current block has been encoded using intra prediction. In this context only the operation of the decoder in the intra prediction mode is described in more detail.

In the intra prediction mode the reconstruction processor 691 decodes information regarding the directionality (block 705). In some embodiments the directionality indication is sufficient to determine how the prediction values for the block to be decoded can be obtained and which reference pixels to use in the intra prediction. The reconstruction processor 691 also determines the reference points which have been used by the encoder in the intra prediction (block 706), and provides the prediction values of the current block (block 707).

In the intra-prediction mode the reconstruction processor 691 may provide the preliminary reconstructed image 618 to the predictor block 695 for reconstruction of the pixel values of the current block.

The embodiments of the invention described above describe the codec in terms of separate encoder and decoder apparatus in order to assist the understanding of the processes involved. However, it would be appreciated that the apparatus, structures and operations may be implemented as a single encoder-decoder apparatus/structure/operation. Furthermore in some embodiments of the invention the coder and decoder may share some or all common elements.

Although the above examples describe embodiments of the invention operating within a codec within an electronic device, it would be appreciated that the invention as described below may be implemented as part of any video codec. Thus, for example, embodiments of the invention may be implemented in a video codec which may implement video coding over fixed or wired communication paths.

Thus, user equipment may comprise a video codec such as those described in embodiments of the invention above.

It shall be appreciated that the term user equipment is intended to cover any suitable type of wireless user equipment, such as mobile telephones, portable data processing devices or portable web browsers.

Furthermore elements of a public land mobile network (PLMN) may also comprise video codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

What is claimed is:

1. An apparatus comprising at least a processor, and a memory associated with said processor and having computer coded instructions stored therein, said instructions when executed by the processor causing the apparatus to perform:
   determining a set of reference pixels, wherein the set of reference pixels for a current block is already encoded pixels on a row above the current block and on a column left of the current block;
   determining a projection of a pixel of the current block to the set of reference pixels based on a directionality for the current block;
   selecting a plurality of reference pixels from the set of reference pixels on the basis of said projection, wherein the plurality of reference pixels selected from the set of reference pixels are on the row above the current block for at least one pixel of the current block and are on the column left of the current block for at least one other pixel of the current block;
   obtaining a prediction value for the pixel of the current block based upon the plurality of reference pixels that were selected from the set of reference pixels; and
   encoding image information of the current block into a bit stream.

2. The apparatus of claim 1, wherein the directionality for the current block is expressed with reference to the pixel on a last column and a last row of the current block and a row or column of the set of reference pixels.

3. The apparatus of claim 1, wherein the apparatus is caused to determine the projection of said pixel to the set of reference pixels by being caused to determine the projection to a line of reference pictures, and wherein the apparatus is caused to obtain the prediction value by being caused to utilize distance of the projection from the plurality of reference pixels that were selected from the set of reference pixels.

4. The apparatus of claim 1, further comprising computer instructions causing the apparatus to perform:
   determining a directionality value for the current block of pixels.

5. The apparatus of claim 1, further comprising computer instructions causing the apparatus to perform: encoding information indicative of the projection and intra-encoding method into the bit stream.

6. The apparatus of claim 1, wherein an image comprises at least four blocks of pixels in two or more rows and in two or more columns, each block of pixels comprising at least two rows of pixels and two columns of pixels, the apparatus further comprising computer instructions causing the apparatus to perform encoding the image block-wise from left to right and from top to bottom, and determining the projection on the basis of the pixel at the lower right corner of the block as a control point.

7. The apparatus of claim 1, wherein the directionality for the current block comprises an angle indicted as a displacement of a row or column of the current block with respect to a row or column, respectively, of pixels of a neighboring block.

8. The apparatus of claim 1, wherein values of the reference pixels are filtered or processed prior to use as a reference.

9. The apparatus of claim 1, wherein the prediction value for the pixel to be predicted is based on values of non-adjacent reference pixels spaced apart from one another.

10. A method comprising:
   determining a set of reference pixels, wherein the set of reference pixels for a current block is already encoded pixels on a row above the current block and on a column left of the current block;
   determining a projection of a pixel of the current block to the set of reference pixels based on a directionality for the current block;
   selecting a plurality of reference pixels from the set of reference pixels on the basis of said projection, wherein the plurality of reference pixels selected from the set of reference pixels are on the row above the current block for at least one pixel of the current block and are on the column left of the current block for at least one other pixel of the current block;
   obtaining a prediction value for the pixel of the current block based on the plurality of reference pixels that were selected from the set of reference pixels; and
   encoding image information of the current block into a bit stream.

11. The method of claim 10, wherein the directionality for the current block is expressed with reference to the pixel on a last column and a last row of the current block and a row or column of the set of reference pixels.

12. The method of claim 10, wherein determining the projection of said pixel to the set of reference pixels comprises determining the projection to a line of reference pictures, and wherein obtaining the prediction value comprises utilizing distance of the projection from the plurality of reference pixels that were selected from the set of reference pixels.

13. The method of claim 10, further comprising: determining a directionality value for the current block of pixels.

14. The method of claim 10, further comprising:
   encoding information indicative of the projection and encoding method into the bit stream.

15. The method of claim 10, wherein an image comprises at least four blocks of pixels in two or more rows and in two or more columns, each block of pixels comprising at least two rows of pixels and two columns of pixels, the method further comprising: determining the projection on the basis of the pixel at the lower right corner of the block as a control point.

16. The method of claim 10, wherein the directionality for the current block comprises an angle indicted as a displacement of a row or column of the current block with respect to a row or column, respectively, of pixels of a neighboring block.

17. The method of claim 10, wherein values of the reference pixels are filtered or processed prior to use as a reference.

18. The method of claim 10, wherein the prediction value for the pixel to be predicted is based on values of non-adjacent reference pixels spaced apart from one another.

19. A computer program product comprising a non-transitory computer readable storage medium having computer coded instructions stored therein, said instructions when executed by a processor cause an apparatus to:
   determine a set of reference pixels, wherein the set of reference pixels for a current block is already encoded pixels on a row above the current block and on a column left of the current block;
   determine a projection of a pixel of the current block to the set of reference pixels based on a directionality for the current block;
   select a plurality of reference pixels from the set of reference pixels on the basis of said projection, wherein the plurality of reference pixels selected from the set of reference pixels are on the row above the current block for at least one pixel of the current block and are on the column left of the current block for at least one other pixel of the current block;
   obtain a prediction value for the pixel of the current block based on the plurality of reference pixels that were selected from the set of reference pixels; and
   encode image information of the current block into a bit stream.

20. The computer program product of claim 19, wherein the directionality for the current block is expressed with reference to the pixel on a last column and a last row of the current block and a row or column of the set of reference pixels.

21. The computer program product of claim 19, wherein the instructions cause the apparatus to determine the projection of said pixel to the set of reference pixels by determining the projection to a line of reference pictures, and wherein the instructions cause the apparatus to obtain the prediction value by utilizing distance of the projection from the plurality of reference pixels that were selected from the set of reference pixels.

22. The computer program product of claim 19, wherein said instructions further cause the apparatus to determine a directionality value for the current block of pixels.

23. The computer program product of claim 19, wherein said instructions further cause the apparatus to encode information indicative of the projection and encoding method into bit stream.

24. The computer program product of claim 19, wherein an image comprises at least four blocks of pixels in two or more rows and in two or more columns, each block of pixels comprising at least two rows of pixels and two columns of pixels, and wherein said instructions further cause the apparatus to determine the projection on the basis of the pixel at the lower right corner of the block as a control point.

25. The computer program product of claim 19, wherein the directionality for the current block comprises an angle indicted as a displacement of a row or column of the current block with respect to a row or column, respectively, of pixels of a neighboring block.

26. The computer program product of claim 19, wherein values of the reference pixels are filtered or processed prior to use as a reference.

27. The computer program product of claim 19, wherein the prediction value for the pixel to be predicted is based on values of non-adjacent reference pixels spaced apart from one another.

28. An apparatus comprising at least one processor and at least one memory, said at least one memory stored with code thereon, which when executed by said at least one processor, causes the apparatus to:
based on information that is received, examine an indication of a directionality regarding a current block of pixels of an image to be decoded with the current block including a pixel to be intra predicted;
determine a set of reference pixels, wherein the set of reference pixels for the current block is already decoded pixels on a row above the current block and on a column left of the current block;
determine a projection of said pixel to the set of reference pixels based on the directionality for the current block;
select a plurality of reference pixels from the set of reference pixels on the basis of said projection, wherein the apparatus is caused to select the plurality of reference pixels by being caused to select the plurality of reference pixels from the set of reference pixels that are on the row above the current block for at least one pixel of the current block and that are on the column left of the current block for at least one other pixel of the current block; and
obtain a prediction value for the pixel to be predicted based on the plurality of reference pixels that were selected from the set of reference pixels.

29. The apparatus of claim 28, wherein apparatus is caused to determine the projection of said pixel to the set of reference pixels by being caused to determine the projection to a line of reference pictures, and wherein the apparatus is caused to obtain the prediction value by being caused to utilize distance of the projection from the plurality of reference pixels that were selected from the set of reference pixels.

30. The apparatus of claim 28, wherein the directionality for the current block is expressed with reference to the pixel on a last column and a last row of the current block and a row or column of the set of reference pixels.

31. The apparatus of claim 28, further caused to receive an indication of the projection.

32. The apparatus of claim 28, wherein the directionality for the current block comprises an angle indicted as a displacement of a row or column of the current block with respect to a row or column, respectively, of pixels of a neighboring block.

33. The apparatus of claim 28, wherein values of the reference pixels are filtered or processed prior to use as a reference.

34. The apparatus of claim 19, wherein the prediction value for the pixel to be predicted is based on values of non-adjacent reference pixels spaced apart from one another.

35. A method, comprising:
based on information that is received, examining an indication of a directionality regarding a current block of pixels of an image to be decoded with the current block including a pixel to be intra predicted;
determining a set of reference pixels, wherein the set of reference pixels for the current block is already decoded pixels on a row above the current block and on a column left of the current block;
determining a projection of said pixel to the set of reference pixels based on the directionality for the current block;
selecting a plurality of reference pixels from the set of reference pixels on the basis of said projection, wherein selecting the plurality of reference pixels comprises selecting the plurality of reference pixels from the set of reference pixels that are on the row above the current block for at least one pixel of the current block and that are on the column left of the current block for at least one other pixel of the current block; and
obtaining a prediction value for the pixel to be predicted based on the plurality of reference pixels selected from the set of reference pixels.

36. The method of claim 35, wherein determining the projection of said pixel to the set of reference pixels comprises determining the projection to a line of reference pictures, and wherein obtaining the prediction value comprises utilizing distance of the projection from the plurality of reference pixels that were selected from the set of reference pixels.

37. The method of claim 35, wherein the directionality for the current block is expressed with reference to the pixel on a last column and a last row of the current block and a row or column of the set of reference pixels.

38. The method of claim 35, further comprising receiving an indication of the projection.

39. The method of claim 35, wherein the directionality for the current block comprises an angle indicted as a displacement of a row or column of the current block with respect to a row or column, respectively, of pixels of a neighboring block.

40. The method of claim 35, wherein values of the reference pixels are filtered or processed prior to use as a reference.

41. The apparatus of claim 35, wherein the prediction value for the pixel to be predicted is based on values of non-adjacent reference pixels spaced apart from one another.

42. A computer program product comprising a non-transitory computer readable storage medium having computer coded instructions stored therein, said instructions when executed by a processor cause an apparatus to:
based on information that is received, examine an indication of a directionality regarding a current block of pixels of an image to be decoded with the current block including a pixel to be intra predicted;
determine a set of reference pixels, wherein the set of reference pixels for the current block is already decoded pixels on a row above the current block and on a column left of the current block;
determine a projection of said pixel to the set of reference pixels based on the directionality for the current block;
select a plurality of reference pixels from the set of reference pixels on the basis of said projection; and
obtain a prediction value for the pixel to be predicted based upon the plurality of reference pixels that were selected from the set of reference pixels,
wherein the instructions that cause the apparatus to select the plurality of reference pixels comprise instructions configured to cause the apparatus to select the plurality of reference pixels from the set of reference pixels that are on the row above the current block for at least one pixel of the current block and that are on the column left of the current block for at least one other pixel of the current block.

43. The computer program product of claim 42, wherein the instructions that cause the apparatus to determine the projection of said pixel to the set of reference pixels comprise instructions configured to cause the apparatus to determine the projection to a line of reference pictures, and wherein the instructions that cause the apparatus to obtain the prediction value comprise instructions configured to cause the apparatus to utilize distance of the projection from the plurality of reference pixels that were selected from the set of reference pixels.

44. The computer program product of claim 42, wherein the directionality for the current block is expressed with reference to the pixel on a last column and a last row of the current block and a row or column of the set of reference pixels.

45. The computer program product of claim 42, wherein said instructions further cause the apparatus to receive an indication of the projection.

46. The computer program product of claim 42, wherein the directionality for the current block comprises an angle indicted as a displacement of a row or column of the current block with respect to a row or column, respectively, of pixels of a neighboring block.

47. The computer program product of claim 42, wherein values of the reference pixels are filtered or processed prior to use as a reference.

48. The computer program product of claim 42, wherein the prediction value for the pixel to be predicted is based on values of non-adjacent reference pixels spaced apart from one another.

* * * * *